(12) United States Patent
Falorni et al.

(10) Patent No.: US 12,540,072 B2
(45) Date of Patent: Feb. 3, 2026

(54) COMPACT MICROELECTROMECHANICAL ANGULAR RATE SENSOR

(71) Applicant: STMICROELECTRONICS S.r.l., Agrate Brianza (IT)

(72) Inventors: Luca Giuseppe Falorni, Limbiate (IT); Paola Carulli, Milan (IT); Patrick Fedeli, Senago (IT); Luca Guerinoni, Alzano Lombardo (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 517 days.

(21) Appl. No.: 18/185,189

(22) Filed: Mar. 16, 2023

(65) Prior Publication Data

US 2023/0322548 A1    Oct. 12, 2023

Related U.S. Application Data

(60) Provisional application No. 63/326,213, filed on Mar. 31, 2022.

(51) Int. Cl.
*B81B 7/02* (2006.01)

(52) U.S. Cl.
CPC ........ *B81B 7/02* (2013.01); *B81B 2201/0228* (2013.01); *B81B 2203/0109* (2013.01);
(Continued)

(58) Field of Classification Search
None
See application file for complete search history.

(56) References Cited

U.S. PATENT DOCUMENTS

| | | | |
|---|---|---|---|
| 8,459,110 B2 | 6/2013 | Cazzaniga et al. | |
| 9,404,747 B2 * | 8/2016 | Valzasina | G01C 19/5712 |

(Continued)

FOREIGN PATENT DOCUMENTS

| | | |
|---|---|---|
| CN | 102575934 A | 7/2012 |
| CN | 105683710 A | 6/2016 |

(Continued)

OTHER PUBLICATIONS

Acar et al., "Environmentally Robust MEMS Vibratory Gyroscopes for Automotive Applications," *IEEE Sensors Journal* 9(12):1895-1906, Dec. 2009. (13 pages).

(Continued)

*Primary Examiner* — Benjamin P Sandvik
(74) *Attorney, Agent, or Firm* — Seed Intellectual Property Law Group LLP

(57) ABSTRACT

A MEMS angular rate sensor is presented with two pairs of suspended masses that are micromachined on a semiconductor layer. A first pair includes two masses opposite to and in mirror image of each other. The first pair of masses has driving structures to generate a mechanical oscillation in a linear direction. A second pair of masses includes two masses opposite to and in mirror image of each other. The second pair of masses is coupled to the first pair of driving masses with coupling elements. The two pairs of masses are coupled to a central bridge. The central bridge has a differential configuration to reject any external disturbances. Each of the masses of the two pairs of masses includes different portions to detect different linear and angular movements.

20 Claims, 7 Drawing Sheets

(52) U.S. Cl.
CPC ............... *B81B 2203/0163* (2013.01); *B81B 2203/0307* (2013.01); *B81B 2203/04* (2013.01)

(56) References Cited

U.S. PATENT DOCUMENTS

| | | |
|---|---|---|
| 10,330,476 B2 | 6/2019 | Shao |
| 10,760,909 B2 | 9/2020 | Geisberger |
| 2014/0260608 A1 | 9/2014 | Lin et al. |
| 2015/0059473 A1 | 3/2015 | Jia |
| 2015/0114112 A1 | 4/2015 | Valzasina et al. |
| 2015/0316378 A1 | 11/2015 | Kergueris et al. |
| 2015/0377624 A1* | 12/2015 | Falorni ............... B81B 3/0018 73/504.12 |
| 2017/0108336 A1 | 4/2017 | Boysel et al. |

FOREIGN PATENT DOCUMENTS

| | | |
|---|---|---|
| CN | 109716143 A | 5/2019 |
| CN | 219776747 U | 9/2023 |

OTHER PUBLICATIONS

Acar et al., "Inherently Robust Micromachined Gyroscopes With 2-DOF Sense-Mode Oscillator," *Journal of Microelectromechanical Systems* 15(2):380-387, Apr. 2006. (9 pages).

Xu et al., "Frequency Tuning of Work Modes in Z-Axis Dual-Mass Silicon Microgyroscope," *Journal of Sensors*, vol. 2014, Article ID 891735, 2014. (14 pages).

* cited by examiner

COMPACT MICROELECTROMECHANICAL ANGULAR RATE SENSOR

BACKGROUND

Technical Field

The present disclosure relates to a microelectromechanical system having enhanced mechanical characteristics with a reduced size and improved stability and sensitivity.

Description of the Related Art

Generally, microelectromechanical systems (MEMS) are produced by micromachining layers of semiconductor materials. The semiconductor materials are deposited or grown on sacrificial layers. The sacrificial layers can be removed by an etching technique, to make the semiconductor layers free to move or oscillate as a membrane or cantilever. MEMS with the small dimensions (typically micrometers), are widely used for sensing applications of integrated circuits.

MEMS are used in angular rate sensors (ARS) and gyroscopes. A MEMS-based ARS includes a plurality of masses movable in linear directions as well as rotary directions. In these sensors, an angular velocity can be detected based on the displacements of the plurality of masses in response to any movements. The displacements can be detected based on an electrical capacitance variation. The electrical capacitance is generated by a capacitive coupling between suspended semiconductor layers that may be arranged as parallel-plate configurations, where a plurality of electrodes are fixed in parallel with the plurality of masses. The movable masses detect movements of the MEMS in various directions.

The MEMS-based ARS generally includes a symmetrical structure to detect the movements in all directions. A movable structure of an ARS may have two pairs of masses, where each pair has symmetrical features. The symmetrical features provide the capability of rejecting external disturbance when the masses are coupled to a differential detection structure. In this condition, any possible external disturbances have the same or substantially similar effects on both masses of a pair of masses (due to the symmetrical features). Thus, in a differential mode, the effect of the disturbances can be rejected from a reading out process.

Each mass of the plurality of masses of a MEMS-based ARS may include driving structures coupled to sensing structures. The driving structures may include driving electrodes, where a driving electrode converts an electrical signal to a mechanical movement of a driving mass coupled to the driving electrode. The electrical signal may be an alternating current (AC) with a resonance frequency, which results in a mechanical oscillation of the driving mass in a mechanical frequency corresponding to the resonance frequency. This oscillation frequency provides a biasing movement to enable the sensing structure for detecting a triaxial movement. In particular, an electrical circuit coupled with the driving electrode can generate an oscillation frequency with a phase and amplitude of the oscillatory movements.

BRIEF SUMMARY

The present disclosure is directed to a microelectromechanical system (MEMS) sensor for sensing triaxial movements (e.g., angular velocity). An architecture of the MEMS sensor is enhanced to increase both stability and sensitivity, where the sensor operates as an angular rate sensor (ARS).

In one embodiment of the present disclosure, a MEMS-based ARS includes two pairs of suspended masses that are micromachined or otherwise formed from a single semiconductor or silicon layer. Each pair includes two masses opposite to and in mirror image of each other. A first pair of masses has driving structures to generate an oscillation frequency in a linear direction. The first pair of masses may be referred to as "the driving masses." A second pair of masses are coupled to the driving masses with coupling elements, where the coupling elements transfer oscillatory movements of the driving masses to the second pair of masses with a same resonance frequency.

The first and second pairs of masses are coupled to and around a central bridge. The central bridge has a differential configuration to reject any external disturbances. Each of the masses of the first and the second pairs detect different linear and angular movements. The configuration of the masses increases stability and sensitivity of the MEMS sensor to triaxial movements.

BRIEF DESCRIPTION OF THE SEVERAL VIEWS OF THE DRAWINGS

Aspects of the present disclosure are best understood from the following detailed description when read with the accompanying figures. It is noted that various features are not drawn to scale.

DETAILED DESCRIPTION

Figure 1A:
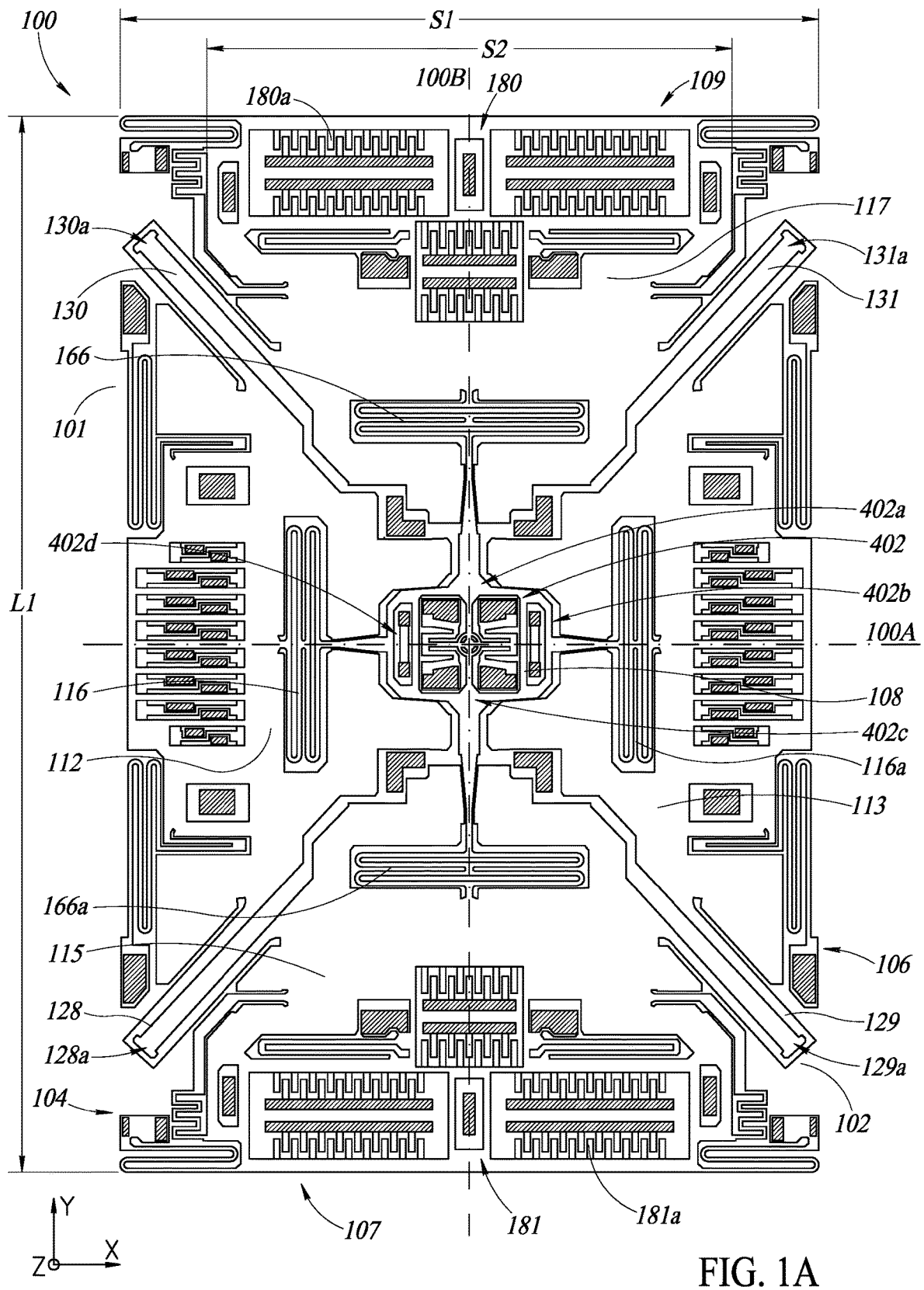
FIG. 1A is a schematic top plan view of a microelectromechanical system according to embodiments of the present disclosure.

FIG. 1A is a schematic top plan view of a microelectromechanical system (MEMS) sensor 100 according to embodiments of the present disclosure. The MEMS sensor 100 may be an angular rate sensor (ARS) or a three-axis gyroscope configured to detect three-dimensional movements (e.g., x, y, and z in FIG. 1A). The gyroscope may be a single silicon layer micromachined element. The MEMS sensor 100 has a rectangular shape that is symmetrical along a first symmetry axis 100A and a second symmetry axis 100B.

The MEMS sensor 100 includes a substrate 102 that is coupled to a plurality of suspended masses. The plurality of suspended masses (112, 113, 115, 117) are coupled by coupling elements (128, 129, 130, 131) positioned at corners of adjacent masses. The coupling elements enable both drive and sense motions for these masses. The MEMS sensor 100 includes a single drive system and three independent sense axes formed in the single silicon layer. The plurality of suspended masses are micromachined in a single silicon layer. The motions in three independent axes are sensed by displacement signals that are converted to electrical signals by parallel plate stators placed below the plurality of suspended masses. In various embodiments, the parallel plate stators are formed in a single silicon layer. As will be described in more detail below, the plurality of masses, the plurality of drive structures, the springs or elastic elements, and the sensing electrodes are all formed from a single silicon or semiconductor layer. The substrate 102 may be a semiconductor material, such as silicon, a silicon on insulator, or other suitable material.

The plurality of suspended masses, which includes a first mass 112 and a second mass 113 that is opposite to and a mirror image of the first mass 112. The plurality of suspended masses also includes a third mass 115 and a fourth mass 117 that is opposite to and a mirror image of the third mass 115.

The drive system includes a first and second driving structures 180, 181, positioned in the fourth mass 117 and the third mass 115, respectively. The substrate 102 has a first edge 104 that is opposite to a second edge 106 and third edge 107 that is opposite to a fourth edge 109. The first edge 104 is spaced from the second edge 106 by a distance, S1. The distance S1 also extends from an outer most edge of a first spring 196 to an outer most edge of a second spring 197 (see FIG. 1C).

In some embodiments, a length of the third edge 107 is the same as a length of the fourth edge 109 that is equal or substantially equal to the distance S1. The third edge 107 is spaced from the fourth edge 109 by a distance L1. In some embodiments, a length of the first edge 104 is the same as a length of the second edge 106 that is equal or substantially equal to the distance L1.

Figure 1B:
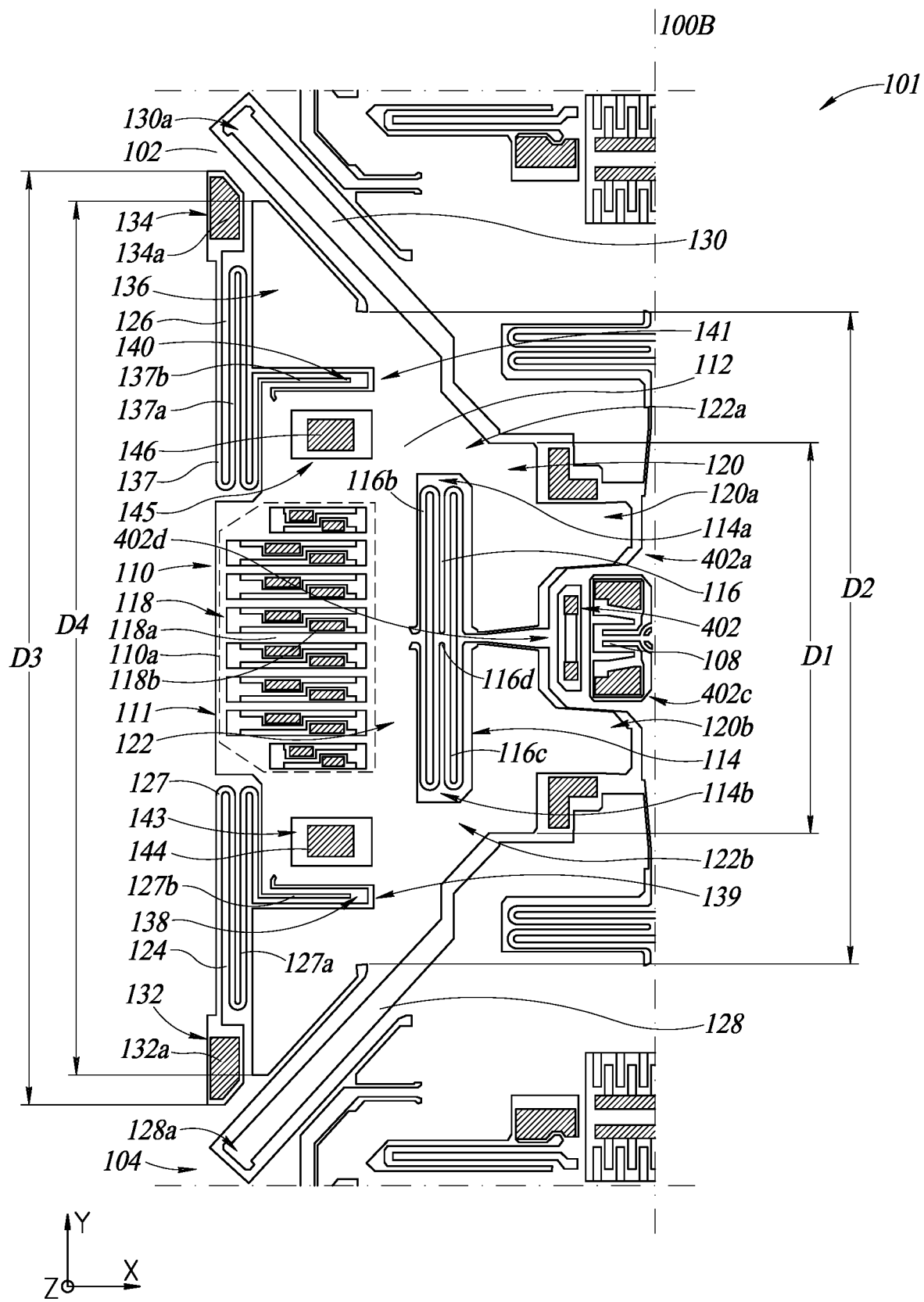
FIG. 1B is enhanced view of the microelectromechanical system of FIG. 1A.

The first mass 112 has a largest dimension D4 (as shown in FIG. 1B) that is adjacent to the first edge 104 and the second mass 113 has a largest dimension that is adjacent to the second edge 106. The largest dimension of the second mass 113 is substantially similar or the same as the largest dimension D4 of the first mass 112. The second mass is not shown in FIG. 1B for drawing clarity. The third mass 115 includes a largest end or dimension that is closer to the third edge 107 than the fourth edge 109. The fourth mass 117 includes a largest end or dimension S2 that is closer to the fourth edge 109 than the third edge 107. The largest dimension of the third mass 115 is substantially similar or the same as the largest dimension S2 of the fourth mass 117. The third mass 115 is not shown in FIG. 1C for drawing clarity.

First and second driving structures 180, 181 include capacitive comb-fingers 180a, 181a (also known as comb-drive actuators). The capacitive comb-fingers 180a are closer than the spring 166 to the fourth edge 109 and the capacitive comb-fingers 181a are closer than the spring 166a to the third edge 107. The capacitive comb-fingers 180a, 181a provides actuation of the driving masses.

The first and second drive structures are configured to drive all four masses in a "beating heart" style. More detail of the first and second driving structures 180, 181 are described in FIG. 1C. The first driving structure 180 is adjacent to or abuts the fourth edge 109 and the second driving structure is adjacent to or abuts the third edge 107.

A central bridge 108 is centrally positioned between the plurality of suspended masses 112, 113, 115, and 117. In some examples, the central bridge 108 includes a square, rectangular, or polygon shaped frame 402. In FIG. 1A, the central bridge 108 includes four sides, where each side includes a flexible or elastic extension 402a-402d from the central bridge to one of the plurality of suspended masses 112, 113, 115, and 117. Each of the flexible extensions 402a-402d is coupled in an opening which extends from the central bridge 108 to one of the springs 116,116a, 166, and 166a (more details are described in FIG. 1B-1D). Inside the square shape frame 402 of the central bridge 108, there are elastic elements coupled to the substrate 102 with four anchors 422a, 424a, 426a, and 428a (more details are described in FIG. 1E).

Each mass of the plurality of masses 112, 113, 115, and 117 includes a smaller end that is adjacent to the central bridge 108. The small end of the masses 112 and 113 is partially around the central bridge 108 (see extensions 120a, 120b in FIG. 1B and the symmetrical extensions for the mass 113). Portions of the small end of the masses 112, 113 are between the small end of the masses 115, 117 and the central bridge 108. The extensions 402a, 402c extend from the central bridge 108 and pass from a distance between the small end of the masses 112, 113.

The first mass 112 is coupled to the third mass 115 with a coupling element 128 and to the fourth mass 117 with a coupling element 130. The second mass 113 is coupled to the third mass 115 with a coupling element 129 and to the fourth mass 117 with a coupling element 131. The plurality of masses 112, 113, 115, and 117 are generally trapezoidal or truncated triangular shaped. The coupling elements 128-131 are coupled to the plurality of masses 112, 113, 115, and 117 at a middle portion of an angled side of the trapezoidal or truncated triangular. In some examples, the coupling elements 128-131 are driving springs that pull the first and second masses 112, 113 as the third and fourth masses 115, 117 are driven by first and second driving structures 180, 181. The coupling elements 128 and 130 have folded ends 128a and 130a adjacent to the first edge 104, adjacent to anchors 132a, 134a, respectively (more details are described in FIG. 1B). The coupling elements 129 and 131 have folded ends 129a and 131a adjacent to the second edge 106, adjacent to anchors 132b, 134b, respectively (not shown for drawing clarity).

To illustrate more of the features of the first mass 112, FIG. 1B provides an enhanced view of an area 101 of FIG. 1A. The area 101 includes the first mass 112 and portions of the third and fourth masses 115, 117. The second mass 113 includes similar features as described for the first mass 112 in FIG. 1B, in a mirror image orientation about the symmetry axis 100B.

A first detection structure 110 includes a plurality of openings 111 in the first mass 112 between the first edge 104 and the central bridge 108 that is closer to the first edge 104 than the central bridge 108. The first spring 116 is within an opening 114 in the first mass 112. The opening 114 is between the plurality of openings 111 and the central bridge 108. A first portion 120 of the first mass 112 is between the opening 114 and the central bridge 108, and a second portion 122 of the first mass 112 is between the opening 114 and the plurality of openings 111. The first portion 120 is closer to the central bridge 108 than the second portion 122 of the first mass 112.

The first portion 120 that corresponds to the smallest dimension has a dimension $D_1$ in a first direction y. The rigid extension 120a extends between the flexible extensions 402a and 402d from the central bridge 108. The rigid extension 120b extends between the flexible extensions 402c and 402d around the central bridge 108. The second portion 122 of the mass has a dimension $D_2$ in the first direction y. Connecting portion 122a, 122b of the mass are coupled between the first portion 120 and the second portion 122 along sides 114a, 114b of the opening 114. The side 114a is closer to the extension 120a than the side 114b. The dimension $D_2$ is greater than the dimension $D_1$. This difference between the dimensions $D_1$ and $D_2$ results in the first mass 112 having a truncated triangle or trapezoidal shape where an area of the first portion 120 that is closer to the central bridge 108 is smaller than an area of the second portion 122 that is closer to the first edge 104.

The coupling elements or springs 130, 128 are coupled to the second portion 122 of the mass, i.e. the mid-portion of the mass. The springs 128,130 extend from this location at an angle away from the central bridge, but stay within a boundary of the anchors, like anchor 134a.

The extensions 120a and 120b of the first mass 112 provide an additional sensitivity during a detection phase. Thus, extensions 120a and 120b lead to detection of a more significant movement than the parts of the first mass 112 that are farther from the central bridge 108 (e.g., the second portion 122).

In various embodiments, a second spring 124 and a third spring 126 are coupled between the first edge 104 and the second portion 122. The second and third springs 124, 126 are involved in a driving movement of the MEMS sensor 100 and in detection of movements about a third direction z, which is transverse to both the first and second directions x, y. The second spring 124 is between the end 128a and the detection structure 110 adjacent to the first edge 104. The third spring 126 is between the end 130a and the detection structure 110 adjacent to the first edge 104. The second spring 124 is separated from the third spring 126 by the detection structure 110. The coupling element 130 is closer to the third spring 126 than the second spring 124 of the first mass 112. The second spring 124 is a folded spring including a thin extension 127 that extends from a first end 132 to a second end 138. The first end 132 is coupled to the substrate 102 by the anchor 132a and the second end 138 is coupled to an opening 139 within the first mass 112. The anchor 132a is closer than the opening 139 to the first edge 104. The thin extension 127 includes a first folded element 127a that extends along the first direction y and a second folded element 127b that extends along the second direction x into the opening 139 of the first mass 112.

The third spring 126 is a folded spring including a thin extension 137 that extends from a first end 134 to a second end 140. The first end 134 is coupled to the substrate 102 by the anchor 134a and the second end 140 is coupled to an opening 141 within the first mass 112. The anchor 134a is closer than the opening 141 to the first edge 104. The thin extension 137 includes a first folded element 137a that extends along the first direction y and a second folded element 137b that extends along the second direction x into the opening 141 of the first mass 112. A dimension $D_3$ between the first end 132 and the first end 134 is greater than the dimension $D_2$. The dimension $D_3$ is less than the length $L_1$ of the first edge 104.

The first mass 112 includes a third portion 136 that is aligned with and adjacent to the plurality of openings 111. The third portion 136 is between the second portion 122 and each of the second spring 124 and the third spring 126. The third portion 136 is on both sides of the plurality of openings 111. The third portion 136 extends from the coupling element 128 to the coupling element 130 in the first direction y. The third portion 136 has a dimension $D_4$ in the first direction y that is greater than the dimension $D_2$. The dimension $D_4$ is less than the dimension $D_3$.

The second end 138 of the second spring 124 extends into the opening 139 in the third portion 136 in the second direction x. The second end 140 of the third spring 126 extends into the opening 141 in the third portion 136 in the second direction x. The third portion 136 includes an opening 143 that surrounds an anchor 144 and an opening 145 that surrounds an anchor 146. In various embodiments, the anchors 144, 146 may operate as stoppers for the first mass 112. The opening 143 is separated from the opening 145 by the detection structure 110. The opening 143 is closer to the second spring 124 than the third spring 126, and the opening 145 is closer to the third spring 126 than the second spring 124.

In some embodiments, the first spring 116 has a folded structure. The folded structure of the first spring 116 includes two separate loops 116b, 116c coupled together with a junction 116d. The loop 116c is coupled to the first portion 120 and the loop 116b is coupled to the second portion 122. The loop 116c is closer than the loop 116b to the central bridge 108. In some examples, the loop 116c is directly coupled to the central bridge 108 through the extension 402d along the second direction x. The extension 402d is free to move independent from the first portion 120. The folded structure of the spring 116 provides a flexibility of the first mass 112 to oscillate in a driving frequency along the second direction x, while the extension 402d provides a flexibility of the first mass 112 to move along the third direction z.

The detection structure 110 includes a plurality of electrodes 110a. Each of the plurality of electrodes 110a includes a structure 118. The structure 118 includes a movable electrode 118a and a fixed electrode 118b. The movable electrode 118a is a part of the first mass 112 and the fixed electrode 118b is coupled to the substrate 102 (e.g., by an anchor). The plurality of electrodes 110a may include a number of the movable electrode 118a arranged in parallel with each other along the first direction y while each of the movable electrode 118a is capacitively coupled to the respective fixed electrode 118b. The detection structure 110 may detect the movements around the third direction z, e.g., yawing movements. In this condition, the detection structure 110 forms a yaw frame. A yaw movement changes a distance between the movable electrode 118a and the fixed electrode 118b. The capacitively coupled the movable electrode 118a and the fixed electrode 118b form an equivalent capacitance which is readable by an external readout circuit coupled to the MEMS sensor 100. The distance variation between the movable electrode 118a and the fixed electrode 118b has a reverse effect on the equivalent capacitance of the detection structure 110. Thus, the external readout circuit detects the yaw movements by reading out the variation of the equivalent capacitance of the detection structure 110.

Figure 1C:
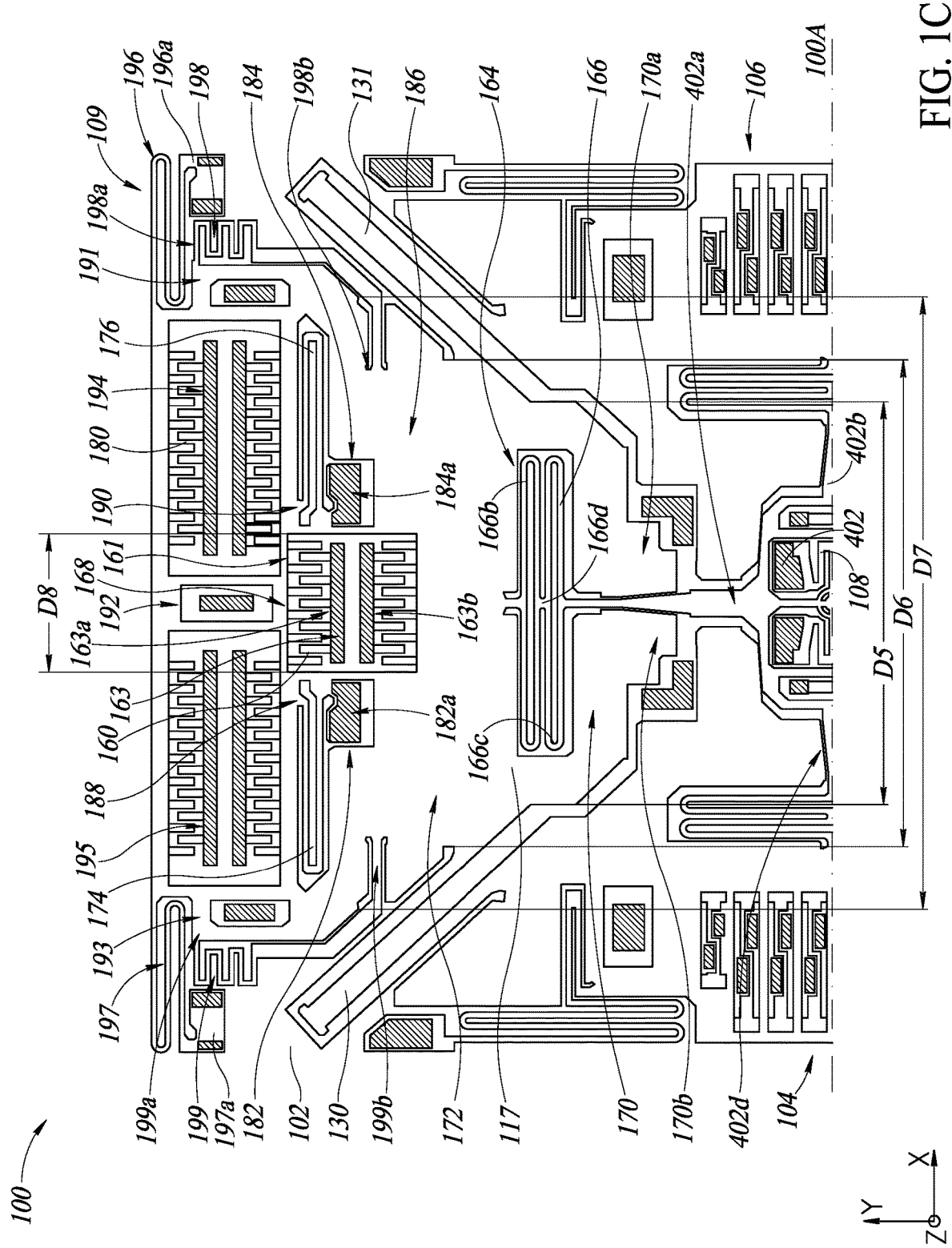
FIG. 1C is enhanced view of the microelectromechanical system of FIG. 1A.

To illustrate more of the features of the fourth mass 117, FIG. 1C provides an enhanced view of an area between the fourth edge 109 and the symmetry axis 100A of FIG. 1A. The area of FIG. 1C includes the fourth mass 117 and portions of the first and second masses 112, 113. The third mass 115 includes similar features as described for the fourth mass 117 in FIG. 1C, in a mirror image orientation about the symmetry axis 100A.

A second detection structure 160 is within an opening 161 in the fourth mass 117 between the fourth edge 109 and the central bridge 108. A third spring 166 is within an opening 164 in the fourth mass 117. The opening 164 is between the opening 161 and the central bridge 108. A first portion 170 of the fourth mass 117 is between the opening 164 and the central bridge 108, and a second portion 172 of the fourth mass 117 is between the opening 164 and the opening 161. The first portion 170 is closer than the second portion 172 of the fourth mass 117 to the central bridge 108. The opening 164 is closer than the opening 161 to the central bridge 108.

The first portion 170 has a dimension $D_5$ in the second direction x. Extensions 170a and 170b extend along the extension 402a toward the central bridge 108. The extension 170b is closer than the extension 170a to the first mass 112. The second portion 172 has a dimension De in the second direction x. The dimension $D_6$ is greater than the dimension $D_5$. This difference between the dimensions $D_5$ and $D_6$ results in a truncated triangle or trapezoidal shape of the fourth mass 117. where the first portion 170 that is closer than second portion 172 to the central bridge 108 is smaller than the second portion 172 that is closer than the first portion 170 to the edge 109.

The extensions 170a and 170b of the fourth mass 117 provide additional sensitivity during a detection phase. Thus, the extensions 170a and 170b lead to detection of a more significant movement than the parts of the fourth mass 117 that are farther from the central bridge 108 (e.g., second portion 172).

In various embodiments, the driving structure 180 is between the fourth edge 109 and the second detection structure 160. The fourth mass 117 includes a third portion 186. The third portion 186 is aligned with and adjacent to the opening 161. The third portion 186 is on both sides of the opening 161 in the second direction x. The third portion 186 is between the second portion 172 and the driving structure 180 in the first direction y. The third portion 186 extends from the coupling element 130 to the coupling element 131 in the second direction x. The third portion 186 has a dimension $D_7$ in the second direction x that is greater than the dimension $D_6$.

A fourth spring 174 is extended from the opening 161 along a side 168 of the driving structure 180 along the second direction x. A fifth spring 176 is extended from the opening 161 along the side 168 of the driving structure 180 along the second direction x. The side 168 of the driving structure 180 is tangential with the detection structure 160. The fourth spring 174 is separated from the fifth spring 176 by the detection structure 160 in the second direction x. The coupling element 130 is closer than the fifth spring 176 of the fourth mass 117 to the fourth spring 174.

The fourth spring 174 is a folded spring that has a thin extension that extends from a first end 182 to a second end 188. The first end 182 is coupled to the substrate 102 by an anchor 182a and the second end 188 is coupled to the driving structure 180. The fifth spring 176 is a folded spring that has a thin extension that extends from a first end 184 to a second end 190. The first end 184 is coupled to the substrate 102 by an anchor 184a and the second end 190 is coupled to the driving structure 180. A dimension $D_5$ of the detection structure 160 in the second direction x is substantially the same as a distance between the first end 182 and the first end 184 in the second direction x. The dimension $D_5$ is less than the dimension $D_5$.

The driving structure 180 includes openings 191, 192, and 193. The opening 191 is closer to the coupling element 131 than the openings 192 and 193 in the second direction x. The opening 193 is closer to the coupling element 130 than the openings 191 and 192 in the second direction x. The opening 192 is closer to the detection structure 160 than the openings 191 and 193 in the second direction x. An anchor is in each of the openings 191, 192, and 193. The driving structure 180 further includes a pair of parallel electrodes 194 extended from the opening 192 to the opening 191 in the second direction x, and a pair of parallel electrodes 195 extended from the opening 192 to the opening 193 in the second direction x. The pairs of the parallel electrodes 194 and 195 are separated by the opening 192 and are coupled to the substrate 102 with a plurality of anchors. One electrode of the parallel electrodes 194 is closer to the fourth edge 109 and is coupled, with a plurality of movable electrodes (comb-fingers 180a described in FIG. 1A), to a side of the driving structure 180 that is in proximity of the fourth edge 109. Another electrode of the parallel electrodes 194 is closer to the opening 161 and the spring 176, and is coupled, with a plurality of movable electrodes (comb-fingers 180a described in FIG. 1A), to a side of the driving structure 180 that is in proximity of the opening 161 and the spring 176. One electrode of the parallel electrodes 195 is closer to the fourth edge 109 and is coupled, with a plurality of movable electrodes, to a side of the driving structure 180 that is in proximity of the fourth edge 109. Another electrode of the parallel electrodes 195 is closer to the opening 161 and the spring 174, and is coupled, with a plurality of movable electrodes, to a side of the driving structure 180 that is in proximity of the opening 161 and the spring 174.

A folded spring 196 is between the opening 191 and the fourth edge 109 in the first direction y. The spring 196 is extended from the driving structure 180 to the second edge 106 along the second direction x. An end of the spring 196 that is in proximity of the second edge 106, is coupled to substrate 102 with a couple of anchors. A folded spring 197 is between the opening 193 and the first edge 104 in the first direction y. The spring 197 is extended from the driving structure 180 to the first edge 104 along the second direction x. An end of the spring 197 that is in proximity of the first edge 104 is coupled to substrate 102 with a couple of anchors. The folded springs 196 and 197, in addition to the springs 174 and 176, provides the flexibility of the fourth mass 117 to oscillate at the driving frequency along the first direction y.

A folded structure 198 has a first end 198a that is coupled to the opening 191 and extends alongside of the coupling element 131 and is coupled to the portion 186 with a second end 198b. The extension of the folded structure 198 in proximity of the first end 198a is folded and extended in the first direction y. The extension of the folded structure 198 in proximity of the second end 198b is extended in the second direction x. A folded structure 199 has a first end 199a that is coupled to the opening 193 and extends alongside of the coupling element 130 and is coupled to the portion 186 with a second end 199b. The extension of the folded structure 199 in proximity of the first end 199a is folded and extended in the first direction y. The extension of the folded structure 199 in proximity of the second end 199b is extended in the second direction x. The folded structures 198 and 199 provide a flexibility of the fourth mass 117 to oscillate along the third direction z as well as move around the third direction z (e.g., yaw movements).

In some embodiments, the third spring 166 has a folded structure. The folded structure comprises two separate loops 166b, 166c coupled together with a junction 166d. The loop 166c is coupled to the first portion 170 and the loop 166b is coupled to the second portion 172. In some examples, one the loop 166c is directly coupled to the central bridge 108 through the extension 402a along the first direction y. The loop 166c is closer than the loop 166b to the central bridge 108. The extension 402a is free to move independent from the first portion 170. The folded structure of the spring 166 provides a flexibility of the fourth mass 117 to oscillate at the driving frequency along the first direction y, while the extension 402a provides a flexibility of the fourth mass 117 to move along the third direction z.

The detection structure 160 includes parallel electrodes 163 extended along the second direction x. The parallel electrodes 163 are coupled to the substrate 102 with a plurality of anchors (not shown for drawing clarity). An electrode 163a of the parallel electrodes 163 is closer than an electrode 163b to the driving structure 180. The electrode 163a is coupled to a side of the driving structure 180 with a plurality of movable electrodes. The electrode 163b is closer than the electrode 163a to the portion 172, and is coupled to a side of the portion 172 with a plurality of movable electrodes. The detection structure 160 may detect the movements along the first direction y which includes driving movements. A driving movement changes a distance between the movable electrodes and fixed electrodes 163a, 163b on the substrate 102. The distance variation has a reverse effect on an equivalent capacitance of the detection structure 160. The equivalent capacitance is readable by an external readout circuit coupled to the MEMS sensor 100. Thus, the MEMS sensor 100 detects the driving movements based on the variation of the equivalent capacitance of the detection structure 160.

Figure 1D:
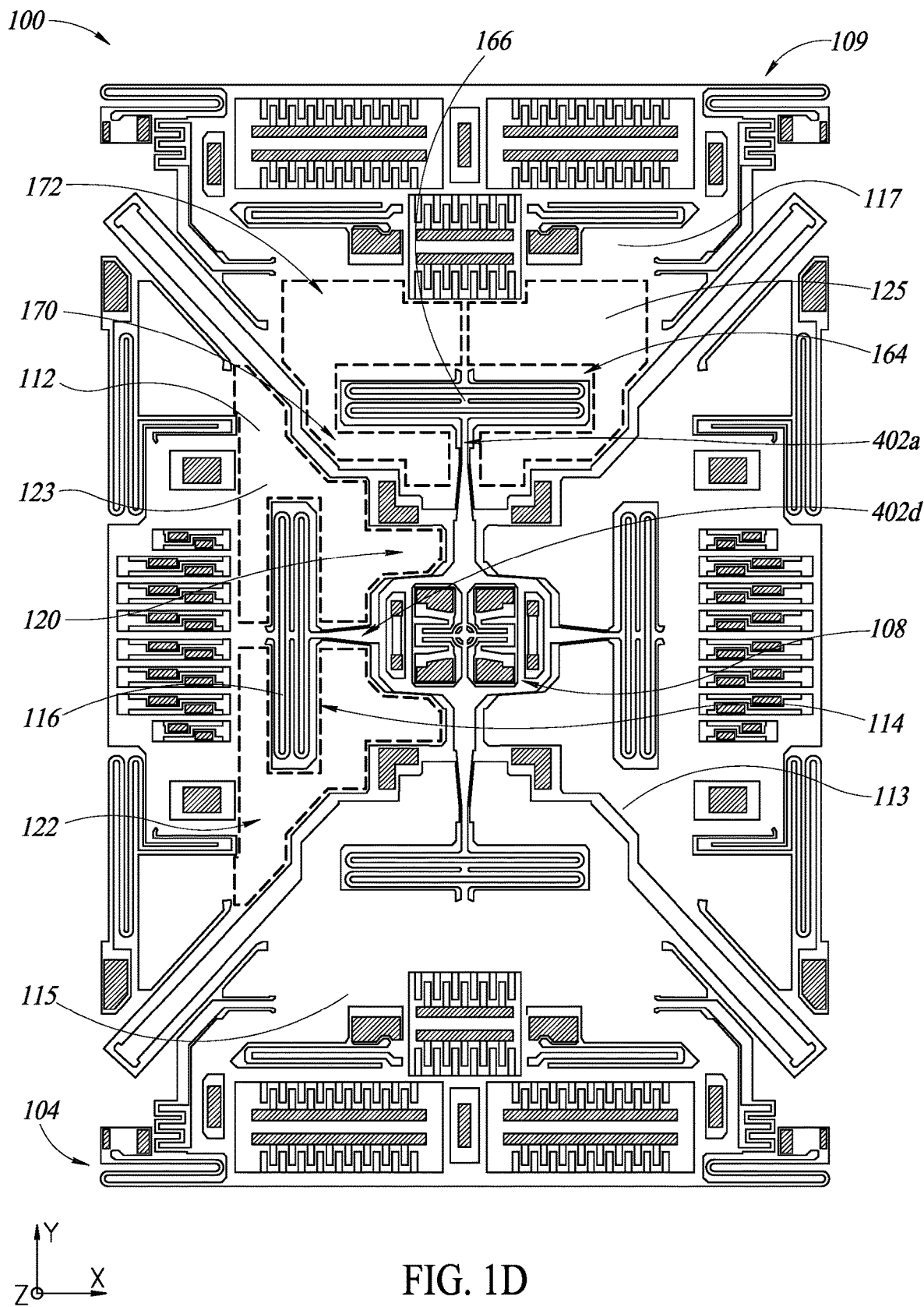
FIG. 1D includes more details of the microelectromechanical system of FIG. 1A.

FIG. 1D is a more detailed view of the MEMS sensor 100 of FIG. 1A. An area 123 in the first mass 112 shows a border of an electrode 123a (not shown for drawing clarity) formed in the substrate 102. An electrode 123b (not shown for drawing clarity) with the same shape as the area 123 is formed on the substrate 102 within the second mass 113. The area 123 has a shape to be aligned with the shape of a combination of the portion 120 and the portion 122. The area 123 is extended around the opening 114 and along sides of the central bridge 108. The shape of the area 123 in the portion 122 has a greater dimension along the first direction y and a less dimension along the second direction x than the portion 120. The electrode 123a in combination with the portions 120, 122 form an electrical capacitance. The electrical capacitance is variable with changing the position of the portions 120, 122. The spring 116 and the extension 402d in connection with the central bridge 108 provide the movements of the portions 120, 122 along the third direction z such as roll movements. An external readout circuit coupled to the MEMS sensor 100 reads out the variation of the electrical capacitance from the electrode 123a on the substrate 102. In some examples, the roll movements generate higher kinetic energy on the portion 120 compared with the portion 122 which results in higher displacement of the portion 120 compared with the portion 122. Therefore, the portion 120 is more effective than the portion 122 while the MEMS sensor 100 is detecting the roll movements.

An area 125 in the fourth mass 117 shows a border of an electrode 125a (not shown for drawing clarity) formed in the substrate 102. An electrode 125b (not shown for drawing clarity) with the same shape as the area 125 is formed on the substrate 102 within the third mass 115. The area 125 has a shape to be aligned with the shape of the combination of the portion 170 and the portion 172. The area 125 is extended around the opening 164 and along sides of the extension 402a. The shape of the area 125 in the portion 172 has a greater dimension along both the first direction y and the second direction x than the portion 170. The electrode 125a in combination with the portions 170, 172 form an electrical capacitance. The electrical capacitance is variable with changing the position of the portions 170, 172. The spring 166 and the extension 402a in connection with the central bridge 108 provide the movements of the portions 170, 172 along the third direction z such as pitch movements. An external readout circuit coupled to the MEMS sensor 100 reads out the variation of the electrical capacitance from the electrode 125a on the substrate 102. In some examples, the pitch movements generate higher kinetic energy on the portion 170 compared with the portion 172 which results in higher displacement of the portion 170 compared with the portion 172. Therefore, the portion 170 is more effective than the portion 172 while the MEMS sensor 100 is detecting the pitch movements.

Figure 1E:
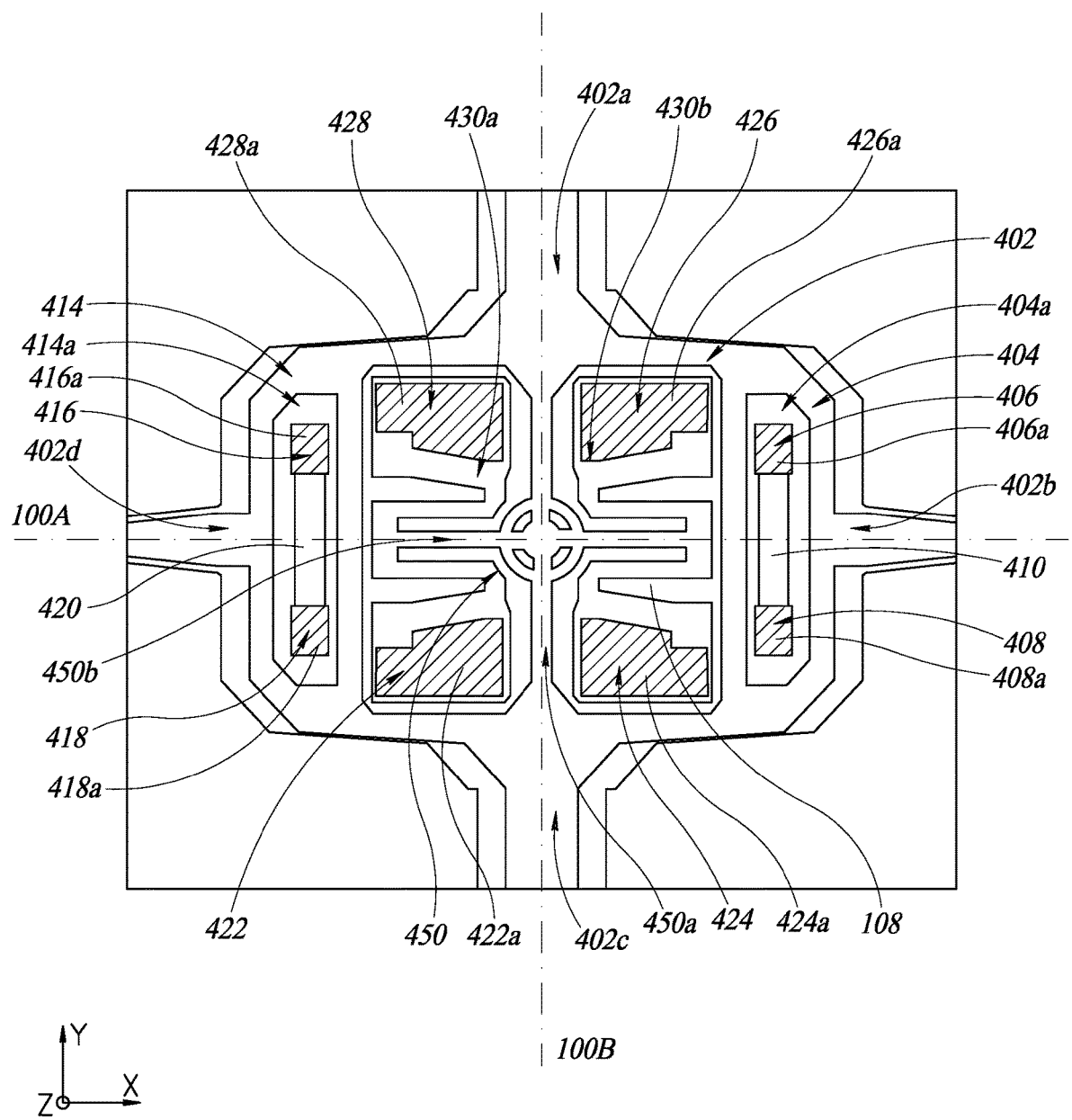
FIG. 1E is an enhanced view of a central bridge of the microelectromechanical system of FIG. 1A.

To illustrate more of the features of the central bridge 108, FIG. 1E provides an enhanced view of the central bridge 108 of the FIG. 1A. The central bridge 108 includes the square, rectangular, or polygon shaped frame 402. Inside, the frame 402 includes a first and a second elastic structures 430a, 430b. The first elastic structure 430a is symmetrical and in mirror image with the second elastic structure 430b about the symmetry axis 100B. The first elastic structure 430a is closer to the extension 402d than the elastic structure 430b. A central point 450 at the center of the frame 402 has a circular shape connection between a first extension 450a and a second extension 450b. The first extension 450a connects the extension 402a into the extension 402c along the first direction y. The second extension 450b connects a center point of the first elastic structure 430a into a center point of the second elastic structure 430b along the second direction x. The first extension 450a is extended along the symmetry axis 100B and the second extension 450b is extended along the symmetry axis 100A.

The first elastic structure 430a has a first end 422 and a second end 428. The first end and second end 422, 428 are coupled to the substrate 102 with anchors 422a, 428a, respectively. The elastic structure 430a has a thin extension folded between the first end 422 and the second end 428. The center point of the elastic structure 430a has a cross interconnection with the extension 450b. The second elastic structure 430b has a first end 424 and a second end 426. The first and second ends 424, 426 are coupled to the substrate 102 with anchors 424a, 426a, respectively. The elastic structure 430b has a thin extension folded between the first end 424 and the second end 426. The center point of the elastic structure 430b has a cross interconnection with the extension 450a.

The extension 402d is coupled to the frame 402 with a trapezoidal shaped connection 414. The connection 414 has an opening 414a. A straight extension 420 is inside the opening 414a. The extension 420 has a first end 416 and a second end 418. The first and second ends 416, 418 are coupled to the substrate 102 with anchors 416a, 418a, respectively. The first end 416 is closer to the extension 402a than the second end 418. The extension 402b is coupled to the frame 402 with a trapezoidal shaped connection 404. The connection 404 has an opening 404a. A straight extension 410 is inside the opening 404a. The extension 410 has a first end 406 and a second end 408. The first and second ends 406, 408 are coupled to the substrate 102 with anchors 406a, 408a, respectively. The first end 406 is closer to the extension 402a than the second end 408.

Figure 2A:
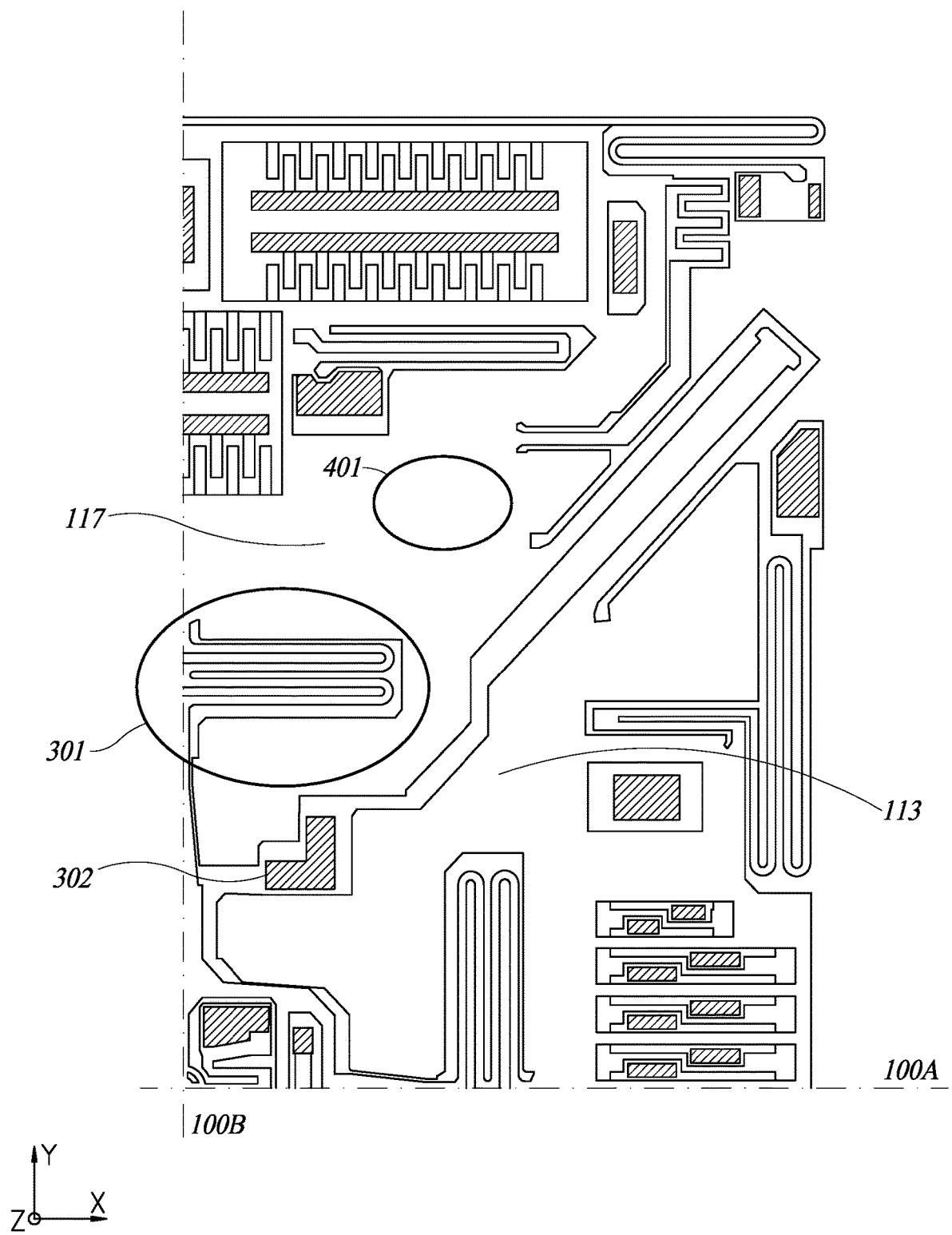
FIG. 2A is an enhanced view of springs of the microelectromechanical system of FIG. 1A.

FIG. 2A shows a quarter of the MEMS sensor 100 of the FIG. 1A, between the symmetry axis 100A and symmetry axis 100B. A stopper 302 is positioned between the fourth mass 117 and the second mass 113. The stopper is symmetrically positioned for the other quarters of the MEMS sensor 100. The stopper 302 has a corner shape to prevent any excessive deflections of the fourth mass 117 and the second mass 113 (and corresponding masses in other quarters) in both the first direction y and the second direction x. This stopper 302 improves robustness of the MEMS sensor 100 compared with the available MEMS sensors for ARS applications.

Figure 2B:
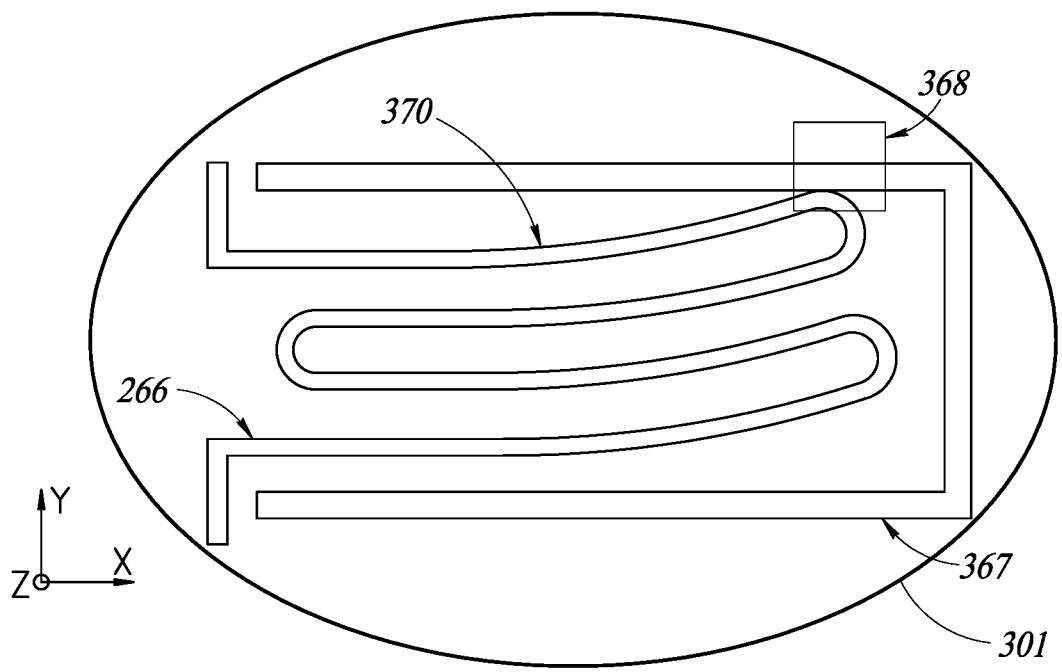
FIG. 2B is a schematic view of the springs of FIG. 2A under an applied stress.

FIG. 2B is an enlarged area 301 of the spring 166 of the fourth mass 117 in FIG. 2A. The area 301 is symmetrically repeated for the other masses. A spring 266 is equivalent to the spring 166 inside the opening 164. The opening 164 is equivalent to a border 367. The border 367 protects the spring 266 from any excessive deflection. An excessive deflection increases a mechanical stress on the spring 266 that may damage the thin extension of the folded structure. The border 367 limits the mechanical stress by reducing the movement space of the spring 266 inside the border 367.

The spring 266 in FIG. 2B is bended under the mechanical stress. The spring 266 has a limited space according to the border 367, to oscillate in the first direction y. In this condition, the spring 266 touches the border 367 in a point 368 and stops from the movement along the first direction y. A maximum mechanical stress is on a portion 370 of the spring 266. In absence of the border 367, the spring 266 may move beyond the point 368 which results in a greater mechanical stress on the portion 370 than the maximum mechanical stress. In this situation, cracks or breaks may happen in the portion 370. Hence, the border 367 protects the spring 266 from these potential damages.

Figure 2C:
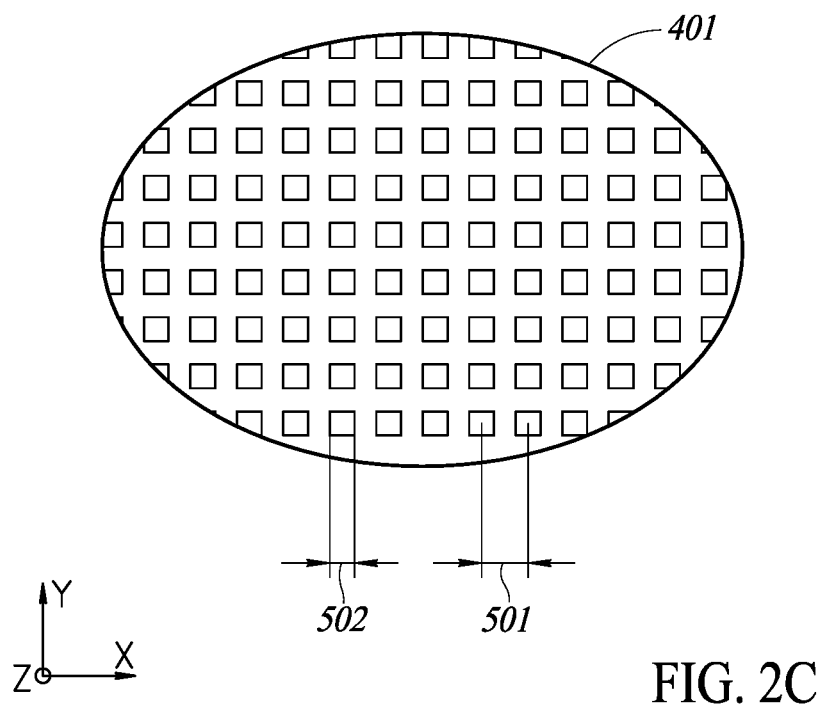
FIG. 2C is an enhanced view of a portion of a mass of FIG. 2A.

FIG. 2C is an enlarged area 401 of the fourth mass 117 of the MEMS sensor 100 in FIG. 2A. The area 401 is the same for the masses 112, 113, 115, and 117 of FIG. 1A. The area 401 has hollow structures or openings. The hollow structures include plurality of holes repeated with a period 501 along both the first and the second directions y, x. Each hole of the plurality of holes is square shaped with a fixed dimension 502. The dimension 502 and period 501 defines a resonance frequency of the hollow structure. By reducing each of the dimension 502 and period 501 the resonance frequency increases.

The MEMS sensor 100 of the present disclosure is capable of detecting triaxial movements. The triaxial movements include driving movements, pitching movements, yawing movements, and rolling movements. The driving movements include movements of the MEMS sensor 100 along the first direction y. As depicted in FIGS. 1A-1E, the springs 196, 197, 174, and 176 of the fourth mass 117 (and the corresponding springs of the third mass 115) maintain driving movements of the MEMS sensor 100 at the resonance frequency (which is generated by an external oscillator). In addition, the spring 116 of the first mass 112 and the spring 166 of the fourth mass 117 (and corresponding springs of the second and third masses 113, 115) control the driving movements of the masses. The coupling elements 128, 129, 130, and 131 translate the generated driving movements of the third and fourth masses 115, 117 along the first direction y, into driving movements of the first and second masses 112, 113 along the second direction x. The driving movements of the masses can be an oscillatory movement at the resonance frequency. The driving movements of the first mass 112 and the second mass 113 are anti-phase. Accordingly, the driving movements of third mass 115 and the fourth mass 117 are anti-phase.

A pitching movement is a movement of the MEMS sensor 100 between the first direction y and the third direction z. The pitching movement is a rotational movement around the second direction x. During a pitching movement, the extension 402a and the extension 402c in combination with the central bridge 108 operate in a sensing mode, while providing a free movement of the third and fourth masses 115, 117 according to a pitching movement. The extensions 170a and 170b of the first portion 170 in the fourth mass 117 (and the corresponding extensions in the third mass 115) have a maximum displacement along the third direction z, compared with the other portions of the fourth mass 117. The displacement can be read as a variation of the electrical capacitance. Thus, the extensions 170a and 170b (and the corresponding extensions in the third mass 115) increase the amplitude of movements and consequently increase a sensitivity of the MEMS sensor 100 to the pitching movement.

A rolling movement is a movement of the MEMS sensor 100 between the second direction x and the third direction z. The rolling movement is a rotational movement around the first direction y. During a rolling movement, the extension 402b and the extension 402d in combination with the central bridge 108 operate in a sensing mode, while providing a free movement of the first and second masses 112, 113 according to a rolling movement. The extensions 120a and 120b of the first portion 120 in the first mass 112 (and the corresponding extensions in the second mass 113) have a maximum displacement along the third direction z, compared with the other portions of the first mass 112. The displacement can be read as a variation of the electrical capacitance. Thus, the extensions 120a and 120b (and the corresponding extensions in the second mass 113) increase the amplitude of movements and consequently increase a sensitivity of the MEMS sensor 100 to the rolling movement.

A yawing movement is a movement of the MEMS sensor 100 between the first direction y and the second direction x. The yawing movement is a rotational movement around the third direction z. During a yawing movement, the springs 126, 124, 196, and 197 of the first and fourth masses 112, 117 (and the corresponding springs in the second and third masses 113, 115) operate in a sensing mode, while providing a free movement of the masses according to a yawing movement. The portion 136 of the first mass 112 (and the corresponding portion in the second mass 113) has a maximum displacement around the third direction z, compared with the other portions of the first mass 112. The displacement can be read as a variation of the electrical capacitance. Thus, the portion 136 of the first mass 112 (and the corresponding portion in the second mass 113) increases the amplitude of orientation around the third direction z and consequently increases a sensitivity of the MEMS sensor 100 to the yawing movement.

The MEMS sensor 100 of the present disclosure operates as an angular rate sensor (ARS) or multiaxial gyroscope. A zero-rate level (ZRL) stability over the temperature is an important parameter to manage in a MEMS gyroscope. Generally, reducing the size of the sensor has a trade-off with the ZRL stability over the temperature that is related to the sensing quality factor (Q-factor) of the sensor. In the MEMS sensor 100 of the present disclosure, although the size of the sensor is reduced as compared with the conventional MEMS gyroscopes, an enhancement of the Q-factor of the sensor provides a high ZRL stability over the temperature as well. The Q-factor of the MEMS sensor 100 is enhanced by reducing the dimension 502 and the period 501 of the hollow structure in FIG. 2C.

The robustness of the MEMS sensor 100 of the present disclosure is enhanced with changing aspects of anchors or stoppers compared with the conventional MEMS gyroscopes. The anchors 146 and 144 of the first mass 112 in FIG. 1B (and the corresponding anchors of the second mass 113) are in-plane anchors that enhance the robustness of the MEMS sensor 100. In addition, the border 367 described in FIG. 2B enhances the robustness of the MEMS sensor 100 by protecting the springs from any potential damages due to an excessive deflection.

Generally, exerting any strain to a MEMS gyroscope changes sensitivity of the gyroscope known as a scale factor drift. This is because of a frequency mismatch between the driving frequency and a sensing frequency. Typically, the sensing frequency is higher than the driving frequency. For the conventional MEMS gyroscope, the mismatch should be compensated by a stiffness change of elastic structures of the MEMS gyroscope. However, in the MEMS sensor 100 of the present disclosure, the sensing frequency is lower than the driving frequency. Thus, scale factor drift is reduced that consequently enhancing the sensitivity stability.

The present disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above." "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A device may be summarized as including a microelectromechanical sensor that includes a substrate having a first edge; a central bridge; a first detection structure between the first edge and the central bridge; and a first suspended mass between the first edge and the central bridge, the first suspended mass includes a first opening; a first spring in the first opening; a first portion that is between the first opening and the central bridge, the first portion having a first dimension in a first direction, the first portion having extensions that extend along sides of the central bridge in a second direction that is transverse to the first direction; and a second portion that is between the first opening and the first detection structure, the second portion having a second dimension in the first direction, the second dimension being greater than the first dimension.

The first suspended mass may include a second spring between the first edge and the second portion and third spring between the first edge and the second portion, the second spring being separated from the third spring by the first detection structure.

The microelectromechanical sensor may include a first driving spring that is coupled to a first side of the first suspended mass; and a second driving spring that is coupled to a second side of the first suspended mass, the second driving spring being closer to the third spring than the second spring of the first suspended mass.

The first suspended mass may include a third portion that extends from the second portion, the third portion aligned with and overlapping the first detection structure.

The third portion may be coupled to the second spring and the third spring.

The third portion may be coupled to the first driving spring and coupled to the second driving spring.

The central bridge may include a central spring structure; a plurality of first anchors coupled to the substrate and to the central spring structure; and an external frame that is around the plurality of first anchors and is coupled to the central spring structure.

The central bridge may include a first extension that extends from the external frame into the first suspended mass, the extensions of the first portion of the first suspended mass being closer to the central spring structure than the first extension of the central bridge along the second direction.

A device may be summarized as including a microelectromechanical sensor that includes a substrate having a first edge opposite to a second edge; a central bridge; a first detection structure between the first edge and the central bridge; a second detection structure between the second edge and the central bridge; a first suspended mass between the first edge and the central bridge, the first suspended mass including a first opening; a first spring in the first opening; a first portion that is between the first opening and the central bridge, the first portion having extensions that extend along sides of the central bridge; and a second portion that is between the first opening and the first detection structure; and a second suspended mass between the second edge and the central bridge, the second suspended mass including a second opening; a second spring in the second opening; a first portion that is between the second opening and the central bridge, the first portion having extensions that extend along sides of the central bridge; and a second portion that is between the second opening and the second detection structure.

The microelectromechanical sensor may include a third suspended mass that is coupled to the central bridge and between the first suspended mass and the second suspended mass; and a fourth suspended mass aligned with the third suspended mass along a first direction, the first suspended mass being aligned with the second suspended mass along a second direction that is transverse to the first direction, the fourth suspended mass is coupled to the central bridge.

The microelectromechanical sensor may include a first driving structure that is spaced from the central bridge by the third suspended mass and a second driving structure that is spaced from the central bridge by the fourth suspended mass.

The microelectromechanical sensor may include a third detection structure that is between the first driving structure and the third suspended mass and a fourth detection structure that is between the second driving structure and the fourth suspended mass.

The third suspended mass may include a third opening; a third spring in the third opening; a first portion that is between the third opening and the central bridge, the first portion having extensions that extend along sides of the central bridge; and a second portion that is between the third opening and the third detection structure.

The fourth suspended mass may include a fourth opening; a fourth spring in the fourth opening; a first portion that is between the fourth opening and the central bridge, the first portion having extensions that extend along sides of the central bridge; and a second portion that is between the fourth opening and the fourth detection structure.

The microelectromechanical sensor may include a first L-shaped anchor that is coupled to the substrate and is between the extension of the first portion of the first suspended mass and the extension of the first portion of the third suspended mass.

The microelectromechanical sensor may include a second L-shaped anchor that is coupled to the substrate and is between the extension of the first portion of the first suspended mass and the extension of the first portion of the fourth suspended mass; a third L-shaped anchor that is coupled to the substrate and is between the extension of the first portion of the third suspended mass and the extension of the first portion of the second suspended mass; and a fourth L-shaped anchor that is coupled to the substrate and is between the extension of the first portion of the second suspended mass and the extension of the first portion of the fourth suspended mass.

A method of sensing angular rate by a microelectromechanical sensor may be summarized as including driving a first mass with a first driving structure and a second mass with a second driving structure, the driving includes oscillatory movements in a driving frequency; coupling the driving of the first and second masses to third and fourth masses by coupling elements, each of the coupling elements being coupled between two of the masses; detecting driving movements with a first detection structure of the first mass and a second detection structure of the second mass, the first detection structure is between the first driving structure and a central bridge, and the second detection structure is between the second driving structure and the central bridge; detecting yawing movements with a third detection structure of the third mass and a fourth detection structure of the fourth mass; detecting pitching movements by a first extension of the first mass and a second extension of the second mass, the first extension extends from the first detection structure toward the central bridge where a dimension of the first extension closer to the central bridge is less than a dimension of the first extension closer to the first detection structure, the second extension extends from the second detection structure toward the central bridge where a dimension of the second extension closer to the central bridge is less than a dimension of the second extension closer to the second detection structure; and detecting rolling movements by a third extension of the third mass and a fourth extension of the fourth mass, the third extension extends from the third detection structure toward and along sides of the central bridge, the fourth extension extends from the fourth detection structure toward and along sides of the central bridge.

A sensing frequency may be less than the driving frequency.

Driving movements of the first mass may be controlled by a first spring and driving movements of the second mass may be controlled by a second spring, the first extension extending around the first spring and the second extension extending around the second spring.

Detection of the driving, yawing, pitching, and rolling movements may be in a differential mode detection by a symmetrical structure of the central bridge.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a microelectromechanical sensor that includes:
a substrate having a first edge;
a central bridge;
a first detection structure between the first edge and the central bridge; and
a first suspended mass between the first edge and the central bridge, the first suspended mass includes:
a first opening;
a first spring in the first opening;
a first portion that is between the first opening and the central bridge, the first portion having a first dimension in a first direction, the first portion having extensions that extend along sides of the central bridge in a second direction that is transverse to the first direction; and
a second portion that is between the first opening and the first detection structure, the second portion having a second dimension in the first direction, the second dimension being greater than the first dimension.

2. The device of claim 1 wherein the first suspended mass includes a second spring between the first edge and the second portion and third spring between the first edge and the second portion, the second spring is separated from the third spring by the first detection structure.

3. The device of claim 2 wherein the microelectromechanical sensor includes:
a first driving spring that is coupled to a first side of the first suspended mass; and
a second driving spring that is coupled to a second side of the first suspended mass, the second driving spring being closer to the third spring than the second spring of the first suspended mass.

4. The device of claim 3 wherein the first suspended mass includes a third portion that extends from the second portion, the third portion aligned with and overlapping the first detection structure.

5. The device of claim 4 wherein the third portion is coupled to the second spring and the third spring.

6. The device of claim 5 wherein the third portion is coupled to the first driving spring and coupled to the second driving spring.

7. The device of claim 1 wherein the central bridge includes:
a central spring structure;
a plurality of first anchors coupled to the substrate and to the central spring structure; and
an external frame that is around the plurality of first anchors and is coupled to the central spring structure.

8. The device of claim 7 wherein the central bridge includes:
a first extension that extends from the external frame into the first suspended mass, the extensions of the first portion of the first suspended mass being closer to the central spring structure than the first extension of the central bridge along the second direction.

9. A device, comprising:
a microelectromechanical sensor that includes:
a substrate having a first edge opposite to a second edge;
a central bridge;
a first detection structure between the first edge and the central bridge;
a second detection structure between the second edge and the central bridge;

a first suspended mass between the first edge and the central bridge, the first suspended mass includes:
a first opening;
a first spring in the first opening;
a first portion that is between the first opening and the central bridge, the first portion having extensions that extend along sides of the central bridge; and
a second portion that is between the first opening and the first detection structure; and
a second suspended mass between the second edge and the central bridge, the second suspended mass includes:
a second opening;
a second spring in the second opening;
a first portion that is between the second opening and the central bridge, the first portion having extensions that extend along sides of the central bridge; and
a second portion that is between the second opening and the second detection structure.

10. The device of claim 9 wherein the microelectromechanical sensor includes:
a third suspended mass that is coupled to the central bridge and between the first suspended mass and the second suspended mass; and
a fourth suspended mass aligned with the third suspended mass along a first direction, the first suspended mass being aligned with the second suspended mass along a second direction that is transverse to the first direction, the fourth suspended mass is coupled to the central bridge.

11. The device of claim 10 wherein the microelectromechanical sensor includes a first driving structure that is spaced from the central bridge by the third suspended mass and a second driving structure that is spaced from the central bridge by the fourth suspended mass.

12. The device of claim 11 wherein the microelectromechanical sensor includes a third detection structure that is between the first driving structure and the third suspended mass and a fourth detection structure that is between the second driving structure and the fourth suspended mass.

13. The device of claim 12 wherein the third suspended mass includes:
a third opening;
a third spring in the third opening;
a first portion that is between the third opening and the central bridge, the first portion having extensions that extend along sides of the central bridge; and
a second portion that is between the third opening and the third detection structure.

14. The device of claim 13 wherein the fourth suspended mass includes:
a fourth opening;
a fourth spring in the fourth opening;
a first portion that is between the fourth opening and the central bridge, the first portion having extensions that extend along sides of the central bridge; and
a second portion that is between the fourth opening and the fourth detection structure.

15. The device of claim 14 wherein the microelectromechanical sensor includes a first L-shaped anchor that is coupled to the substrate and is between the extension of the first portion of the first suspended mass and the extension of the first portion of the third suspended mass.

16. The device of claim 15 wherein the microelectromechanical sensor includes:
a second L-shaped anchor that is coupled to the substrate and is between the extension of the first portion of the first suspended mass and the extension of the first portion of the fourth suspended mass;
a third L-shaped anchor that is coupled to the substrate and is between the extension of the first portion of the third suspended mass and the extension of the first portion of the second suspended mass; and
a fourth L-shaped anchor that is coupled to the substrate and is between the extension of the first portion of the second suspended mass and the extension of the first portion of the fourth suspended mass.

17. A method of sensing angular rate by a microelectromechanical sensor, the method comprising:
driving a first mass with a first driving structure and a second mass with a second driving structure, the driving includes oscillatory movements in a driving frequency;
coupling the driving of the first and second masses to third and fourth masses by coupling elements, each of the coupling elements being coupled between two of the masses;
detecting driving movements with a first detection structure of the first mass and a second detection structure of the second mass, the first detection structure is between the first driving structure and a central bridge, and the second detection structure is between the second driving structure and the central bridge;
detecting yawing movements with a third detection structure of the third mass and a fourth detection structure of the fourth mass;
detecting pitching movements by a first extension of the first mass and a second extension of the second mass, the first extension extends from the first detection structure toward the central bridge where a dimension of the first extension closer to the central bridge is less than a dimension of the first extension closer to the first detection structure, the second extension extends from the second detection structure toward the central bridge where a dimension of the second extension closer to the central bridge is less than a dimension of the second extension closer to the second detection structure; and
detecting rolling movements by a third extension of the third mass and a fourth extension of the fourth mass, the third extension extends from the third detection structure toward and along sides of the central bridge, the fourth extension extends from the fourth detection structure toward and along sides of the central bridge.

18. The method of claim 17 wherein a sensing frequency is less than the driving frequency.

19. The method of claim 17 wherein driving movements of the first mass are controlled by a first spring and driving movements of the second mass are controlled by a second spring, the first extension extends around the first spring and the second extension extends around the second spring.

20. The method of claim 17 wherein detection of the driving, yawing, pitching, and rolling movements is in a differential mode detection by a symmetrical structure of the central bridge.

* * * * *